(12) United States Patent
Mulaosmanovic et al.

(10) Patent No.: US 10,477,505 B2
(45) Date of Patent: Nov. 12, 2019

(54) MOBILE TRANSCEIVER FOR ASSET TRACKING HAVING A POWER SAVING SCHEME FOR NETWORK ACCESS

(71) Applicant: BlackBerry Limited, Waterloo (CA)

(72) Inventors: Jasmin Mulaosmanovic, Waterloo (CA); Robert Joseph Lombardi, Hamilton (CA); Sergio Javier Berriz, Miami, FL (US)

(73) Assignee: BlackBerry Limited, Waterloo (CA)

( * ) Notice: Subject to any disclaimer, the term of this patent is extended or adjusted under 35 U.S.C. 154(b) by 171 days.

(21) Appl. No.: 15/230,970

(22) Filed: Aug. 8, 2016

(65) Prior Publication Data

US 2018/0041982 A1 Feb. 8, 2018

(51) Int. Cl.
*H04W 64/00* (2009.01)
*G01S 19/13* (2010.01)
*H04L 29/06* (2006.01)
*H04W 8/00* (2009.01)
*H04W 52/02* (2009.01)
(Continued)

(52) U.S. Cl.
CPC ........... *H04W 64/00* (2013.01); *G01S 5/0252* (2013.01); *G01S 19/13* (2013.01); *G01S 19/34* (2013.01); *H04L 63/10* (2013.01); *H04W 8/005* (2013.01); *H04W 52/0245* (2013.01); *H04W 60/04* (2013.01); *Y02D 70/00* (2018.01); *Y02D 70/10* (2018.01); *Y02D 70/1224* (2018.01); *Y02D 70/1242* (2018.01); *Y02D 70/1244* (2018.01); *Y02D 70/1262* (2018.01); *Y02D 70/1264* (2018.01); *Y02D 70/142* (2018.01); *Y02D 70/144* (2018.01); *Y02D 70/162* (2018.01); *Y02D 70/164* (2018.01); *Y02D 70/166* (2018.01)

(58) Field of Classification Search
CPC ......... H04W 4/02; H04W 64/00; H04W 8/22; H04W 4/12; H04W 52/0225; H04W 68/005; G06Q 10/0833; G06F 17/00; G06F 21/88; G01S 5/14; G01S 19/13; G01S 5/0294; G01S 11/02
See application file for complete search history.

(56) References Cited

U.S. PATENT DOCUMENTS 6,711,404 B1   3/2004   Arpee
7,356,561 B2   4/2008   Balachandran
(Continued)

FOREIGN PATENT DOCUMENTS

EP   2011354   1/2009
EP   2640136   3/2014

OTHER PUBLICATIONS

Notification of transmittal of the international search report and written opinion; PCT/US2017/045084; dated Nov. 16, 2017.
(Continued)

*Primary Examiner* — Margaret G Mastrodonato
(74) *Attorney, Agent, or Firm* — Ridout and Maybee LLP

(57) ABSTRACT

A mobile transceiver for asset tracking having a power saving scheme for network access and related method are provided. In one aspect, the method comprises determining a location of the mobile transceiver, determining whether cellular service is likely to be available at the determined location based on a stored signal strength database, and activating the cellular transceiver from a low power mode when it is determined cellular service is likely to be available at the determined location.

15 Claims, 5 Drawing Sheets

(51) Int. Cl.
   *H04W 60/04* (2009.01)
   *G01S 19/34* (2010.01)
   *G01S 5/02* (2010.01)

(56) References Cited

U.S. PATENT DOCUMENTS

| | | | |
|---|---|---|---|
| 7,509,125 | B2 | 3/2009 | Vuong |
| 7,593,711 | B2 | 9/2009 | Romano |
| 7,847,726 | B2 | 12/2010 | Jia |
| 7,853,218 | B2 | 12/2010 | Romano |
| 8,401,548 | B2 | 3/2013 | Vuong |
| 8,494,566 | B2 | 7/2013 | Chen |
| 8,655,378 | B1 * | 2/2014 | Crossno ............ G06Q 10/0833 455/456.1 |
| 2007/0230420 | A1 | 10/2007 | Bumiller et al. |
| 2009/0102660 | A1 | 4/2009 | Evans et al. |
| 2009/0143078 | A1 | 6/2009 | Tu |
| 2010/0056181 | A1 * | 3/2010 | Rippon ................ H04W 8/22 455/456.3 |
| 2010/0250129 | A1 | 9/2010 | Babitch et al. |
| 2011/0116453 | A1 | 5/2011 | Huang et al. |
| 2012/0057476 | A1 | 3/2012 | Chan |
| 2013/0238915 | A1 | 9/2013 | Kashikar |
| 2015/0087301 | A1 * | 3/2015 | Choudhary .......... H04W 48/16 455/434 |

OTHER PUBLICATIONS

Aaron Schulman, Vishnu Navda, Ramachandran Ramjee, Neil Spring, Pralhad Deshpande, Calvin Grunewald, Kamal Jain, and Venkata N. Padmanabhan, Bartendr: A Practical Approach to Energy-aware Cellular Data Scheduling, MobiCom '10 Proceedings of the sixteenth annual international conference on Mobile computing and networking, pp. 85-96, Sep. 20-24, 2010, Chicago, Illinois, USA.
Abtin Keshavarzian, Huang Lee and Lakshmi Venkatraman, Wakeup Scheduling in Wireless Sensor Networks, MobiHoc '06 Proceedings of the 7th ACM international symposium on Mobile ad hoc networking and computing, pp. 322-333, May 22-25, 2006, Florence, Italy.
Unknown Author, Signal Tracker—Cell Phone Signals on the map, BlackBerry World, Application Profile, https://appworld.blackberry.com/webstore/content/34952895/?countrycode=CA&lang=en, at least as early as Oct. 10, 2015.
Unknown Author, Monitoring a GPS Tracker with our Alerts System, http://www.usfleettracking.com/blog/2014/04/23/monitoring-gps-tracker-alerts-system/, Apr. 2014.
Unknown Author, About OpenSignal, https://opensignal.com/about/, at least as early as Oct. 10, 2015.
Unknown Author, No title, page lists smartphone apps that allow the contribution of GSM cell tower measurements to the OpenCellID database, http://wiki.opencellid.org/wiki/Data_sources, as early as Jul. 2, 2015.
Unknown Author, Signal CS, GPS Tracking System, http://www.signalcs.com/pages.php?page_id=8, 2013.
Unknown Author, Railcar GPS Tracking & Monitoring, Lat-Lon, at least as early as Oct. 10, 2015.
International Preliminary Report on Patentability; PCT/US2017/045084 dated Feb. 21, 2019.

* cited by examiner

MOBILE TRANSCEIVER FOR ASSET TRACKING HAVING A POWER SAVING SCHEME FOR NETWORK ACCESS

TECHNICAL FIELD

The present disclosure relates generally to mobile transceivers, and more specifically, to a mobile transceiver for asset tracking having a power saving scheme for network access.

BACKGROUND

Global Navigation Satellite System (GNSS) tracking devices, such as Global positioning system (GPS) tracking devices, are devices carried by objects or persons ("carriers") which measure the location of the carrier using the GNSS at regular intervals and typically store the location in internal memory. There are three main types of GNSS tracking devices: a data logger, a data pusher and a data puller. A data logger stores the measured location data in internal memory for subsequent download and analysis. A data pusher (also known as a beacon) sends location data stored in internal memory to a server or other device in accordance with predefined parameters. A data puller (also known as a transponder) stores location data in internal memory and provides the location data in response to queries from a server or other device.

GNSS tracking devices typically have limited power and/or limited processing resources. Accordingly, methods of efficiently operating and deploying GNSS tracking devices are desirable.

DESCRIPTION OF EXAMPLE EMBODIMENTS

Figure 1:
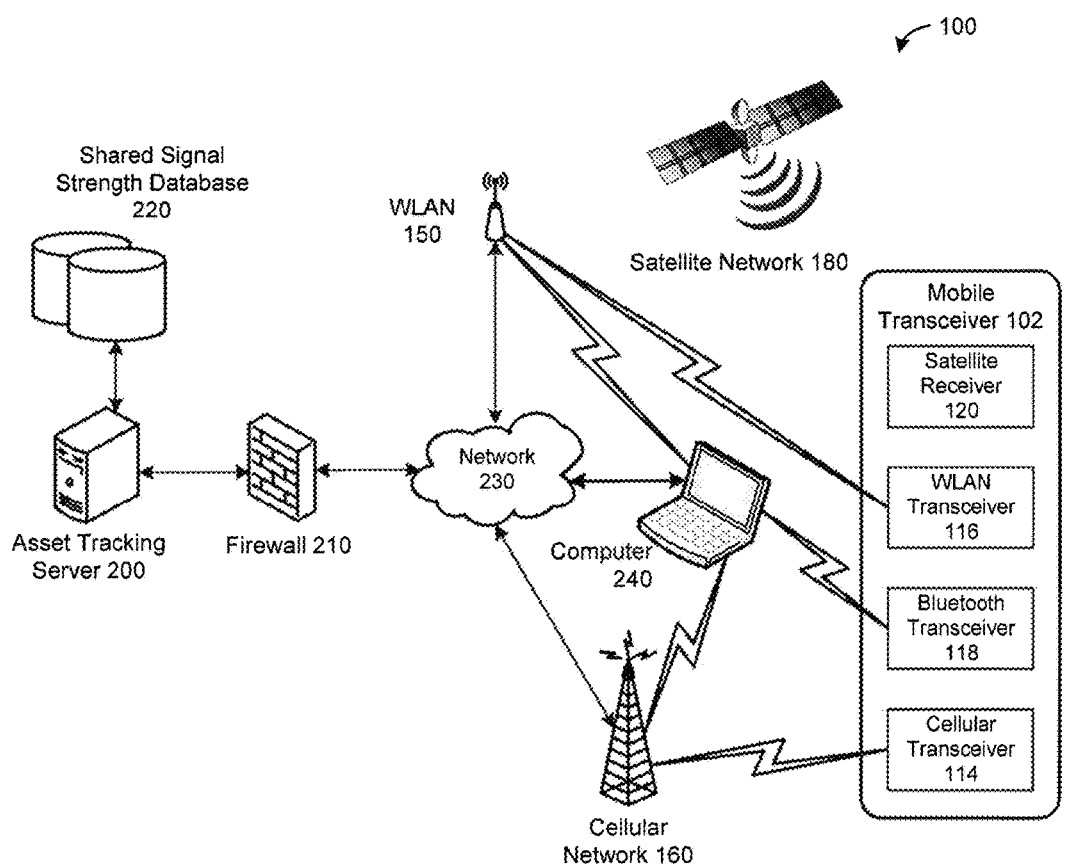
FIG. 1 is a block diagram illustrating a communication system suitable for operating a mobile transceiver in accordance with the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that allows global and long-range tracking applications in which an asset in global and long-range transit can be tracked even though it crosses wireless carrier and network coverage boundaries while in transit. In global and long-range tracking applications the mobile transceiver and the asset being tracked will cross wireless carrier and network coverage boundaries while in transit. For example, it is not uncommon for a shipping container to originate in mainland China and travel around South Africa with a final destination in North America. The mobile transceiver of the present disclosure includes one or more wireless transceivers which allow the mobile transceiver to communicate using one of a number of wireless services, such as 4G LTE, 3G, 2G, WLAN/Wi-Fi and/or Bluetooth, etc. to account for the various wireless services that may be available at any time while in transit.

When the mobile transceiver wakes up after a period of inactivity, the cellular service that was last used may no longer be available. Additionally, if crossing continental boundaries and international borders, the wireless access technology and RF bands may not overlap. The present disclosure provides methods of operating the mobile transceiver (e.g., tracking device) for global and long-range tracking that is power efficient and that extends the expected life of the battery of the mobile transceiver. This is particularly advantageous when the mobile transceiver is provided with a non-rechargeable battery or when a rechargeable battery is provided but the mobile transceiver is used in environments when an external power source to recharge the battery is unavailable.

In accordance with an example embodiment of one aspect of the present disclosure, there is provided a method of operating a mobile transceiver, the mobile transceiver comprising a processor, and a memory, satellite receiver and cellular transceiver each coupled to the processor, the method comprising: determining a location of the mobile transceiver using the satellite receiver; determining whether a cellular service is likely to be available at the determined location based on a signal strength database stored in the memory; and activating the cellular transceiver from a low power mode when it is determined cellular service is likely to be available at the determined location.

In accordance with another example embodiment of one aspect of the present disclosure, there is provided a method of operating a mobile transceiver, the mobile transceiver comprising a processor, and a memory, satellite receiver and cellular transceiver each coupled to the processor, the method comprising: determining a location of the mobile transceiver using the satellite receiver; calculating a speed of travel using location data obtained from the satellite receiver or an asset tracking log; identifying one or more waypoints in a travel itinerary at which cellular service is likely to be available at the determined location based on a signal strength database; determining one or more estimated time of arrivals (ETAs) at the identified one or more waypoints based on the calculated speed; setting one or more alarms to be triggered at the one or more ETAs.

In accordance with an example embodiment of another aspect of the present disclosure, there is provided a mobile transceiver, comprising: a processor; a memory coupled to the processor; a satellite receiver coupled to the processor; and a cellular transceiver coupled to the processor; wherein the processor is configured to perform the methods described herein.

In accordance with an example embodiment of a further aspect of the present disclosure, there is provided a non-transitory machine readable medium having tangibly stored thereon executable instructions for execution by a processor of a mobile transceiver, the mobile transceiver comprising a memory, a satellite receiver, and a cellular transceiver each coupled to the processor, wherein the executable instructions, when executed by the processor, cause the mobile transceiver to perform the methods described herein.

Figure 2:
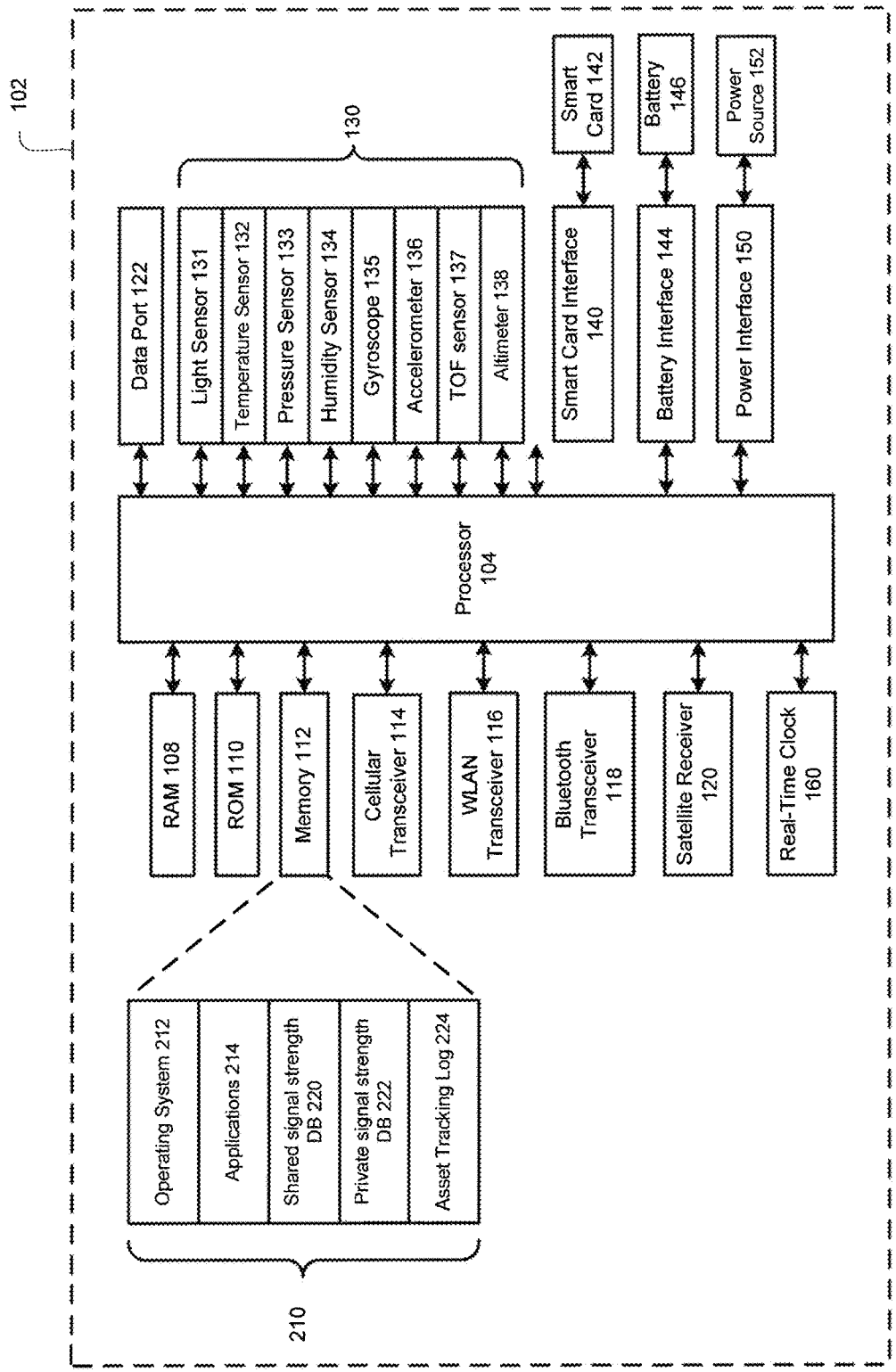
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), a plurality of environmental sensors 130 for sensing the environment of the mobile transceiver 102, and a real-time clock (RTC) 160. The mobile transceiver typically also includes a power management integrated circuit (PMIC) for managing power requirements of the mobile transceiver 102.

The RTC 160 is a low power subsystem that runs even when the mobile transceiver 102 is in deep sleep mode. The RTC 160 typically comprises a crystal oscillator that provides accurate real-time information, such as those provided by Atmel Corporation.

The sensors 130 may comprise a light sensor 131, temperature sensor 132, pressure sensor 133, humidity sensor 134, gyroscope 135, accelerometer 136, one or more time-of-flight (ToF) sensors 137, altimeter 138 and possibly other sensors such as a door contact switch (not shown).

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 uses signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed. In the described embodiment, the cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. In other embodiments, multiple dedicated transceivers may be provided to support different wireless services, such as 4G LTE, 3G and 2G wireless services.

Examples of technologies that can be used by the cellular transceiver 114 include LTE, LTE Advanced, General Packet Radio Service (GPRS), Mobitex™, and Data TAC™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computing device 240, such as a personal computer or tablet. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, Zig-Bee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. In the described embodiment, the mobile transceiver 102 includes a smart card interface 140 for receiving a smart card 142 for storing and reading data by the processor 104. The smart card 142 may be a Subscriber Identity Module (SIM) card for use in a GSM network or other type of smart card for use in the relevant wireless network type which provides wireless network access. In at least some embodiments, the smart card 142 is a Universal Integrated Circuit Card (UICC) containing at least a SIM and a USIM application. UICC is the smart card used in most contemporary GSM and UMTS networks. While a SIM card for a GSM network has been described as an example, the term smart card is intended to encompass all types of smart cards and other similar technology for providing a Universal Subscriber Identity Module (USIM), Removable User Identity Module (R-UIM) or CDMA Subscriber Identity Module (CSIM) or other similar technology used in UMTS and CDMA networks.

The SIM card includes subscriber identity data (also referred to as SIM data) includes information necessary to obtain access to a wireless voice and/or data network provided by a wireless network service provider, depending on the embodiment. The subscriber identity data includes network operator bundle information and/or user data information. Examples of network operator bundle information and/or user data information include subscriber identification information, network selection parameters, network operator data and application data for accessing various data services, etc. In one embodiment, the subscriber identity data comprises subscriber identification information, network selection parameters, and network operator data (sometimes referred to as "network credentials"). In other embodiments, the subscriber identity may include more or less information. For example, in some embodiments, the subscriber identity data may further comprise application data.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service.

The mobile transceiver 102 may also include a power interface, such as a power port, for connecting to an external power source 152 such as an alternating current (AC) power adapter or the computing device 240. The power interface may be a USB port or other port for connecting to the external power source via a cable. The mobile transceiver 102 can use the external power source 152 rather than the battery 146. If the battery 146 is rechargeable, the external power source 152 may be used to recharge the battery 146.

The memory 112 stores data 210, such as application data, and software modules comprising an operating system 212 and applications 214. The software modules or parts thereof may be temporarily loaded into volatile memory such as the RAM 108. The RAM 108 is used for storing runtime data and other data. The application data comprises a shared, global, signal strength database 220 to be used by the mobile transceiver 102 to determine whether to attempt connecting to a cellular RAN and optionally selecting a cellular RAN, as described more fully below. The shared signal strength database 220 is a copy of a shared signal strength database 220 maintained by the asset tracking server 200. The signal strength database 220 may be downloaded from the asset tracking server 200 when not present on the mobile transceiver 102 (e.g., on first boot-up) or when out-of-date. The application data also includes a private, local, signal strength database 222 comprising information collected by the mobile transceiver 102 when connecting or attempting to connect to a cellular RAN such as the cellular network 160.

Referring again to FIG. 1, an example communication system 100 in which a mobile transceiver 102 of the present disclosure can operate will be described. The mobile transceiver 102 typically uses the cellular network 160 to access an asset tracking server (or fleet management server) 200. The asset tracking server 200 may be implemented as one or more server modules and is typically located behind a firewall 210. The asset tracking server 200 is connected to a signal strength database 220. The database 220 may be physically located either locally or remotely from the asset tracking server 200. In some embodiments, the database 220 may be a module of the asset tracking server 200. The asset tracking server 200 provides administrative control and management capabilities over a plurality of managed mobile transceivers 102.

The asset tracking server 200 provides secure transmission of data exchanged between the asset tracking server 200 and the plurality of managed mobile transceivers 102. Communication between the asset tracking server 200 and the mobile transceivers 102 may be encrypted, for example, using Advanced Encryption Standard (AES) or Triple Data Encryption Standard (Triple DES) encryption.

The mobile transceiver 102 use signals received by the satellite receiver 120 from a plurality of satellites in the satellite network 180 to determine its position. For example, the mobile transceiver 102 may use the satellite receiver 120 to determine is location at regular intervals, in accordance with a predefined schedule, or in response to a trigger event, among other possibilities. The frequency or schedule at which the location is determined may be fixed or configurable. The mobile transceiver 102 stores the determined location, typically in terms of latitude and longitude, in a data log stored in the memory 112 of the mobile transceiver 102. The values for latitude and longitude may be specified in one of a number of different formats including degrees minutes seconds (DMS), degrees decimal minutes (DDM), or decimal degrees (DD). A time at which the location was determined is typically also stored in the data log. The data log is sometimes known as an asset tracking log 224.

The mobile transceiver 102 may also use one or more of the sensors 130 to sense or measure an environment of the mobile transceiver 102. For example, the sensors 130 may be used to measure temperature, pressure and humidity, as well as door open or movement events, among other parameters. The sensor data obtained via the sensors 130 and a time at which the sensor data was obtained are also stored in the data log (i.e., the asset tracking log 224), which is stored in the memory 112. The time may be specified using UTC time (Coordinated Universal Time), for example, as defined by International Telecommunications Union Recommendation (ITU-R TF.460-6). Time may be specified in 24 hr time hh:mm:ss format and date may be specified in dd:mm:yyyy format. Alternatively, local time may be supported. As with the location data, the mobile transceiver 102 may collect sensor data at regular intervals, in accordance with a predefined schedule, or in response to a trigger event, among other possibilities. The frequency or schedule at which sensor data is obtained may be fixed or configurable.

The mobile transceiver 102 attempts to connect to the asset tracking server 200 to report location and/or sensor data stored in the asset tracking log 224 at regular intervals, in accordance with a predefined schedule, or in response to a trigger event, among other possibilities. The frequency or schedule at which the mobile transceiver 102 attempts to connect to the asset tracking server 200 may be fixed or configurable. The mobile transceiver 102 typically attempts to connect to the asset tracking server 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking server 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

When the mobile transceiver 102 connects to the cellular network 160, WLAN 150, or computer 240 via Bluetooth and/or USB, the mobile transceiver 102 can send the data log or a portion of the data log (i.e., an unreported portion of the data log) to the asset tracking server 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking server 200. After an unreported record is reported to the asset tracking server 200, its corresponding report status field in the data log is updated.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and need not coincide, although the cycles typically overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking server 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Figure 6:
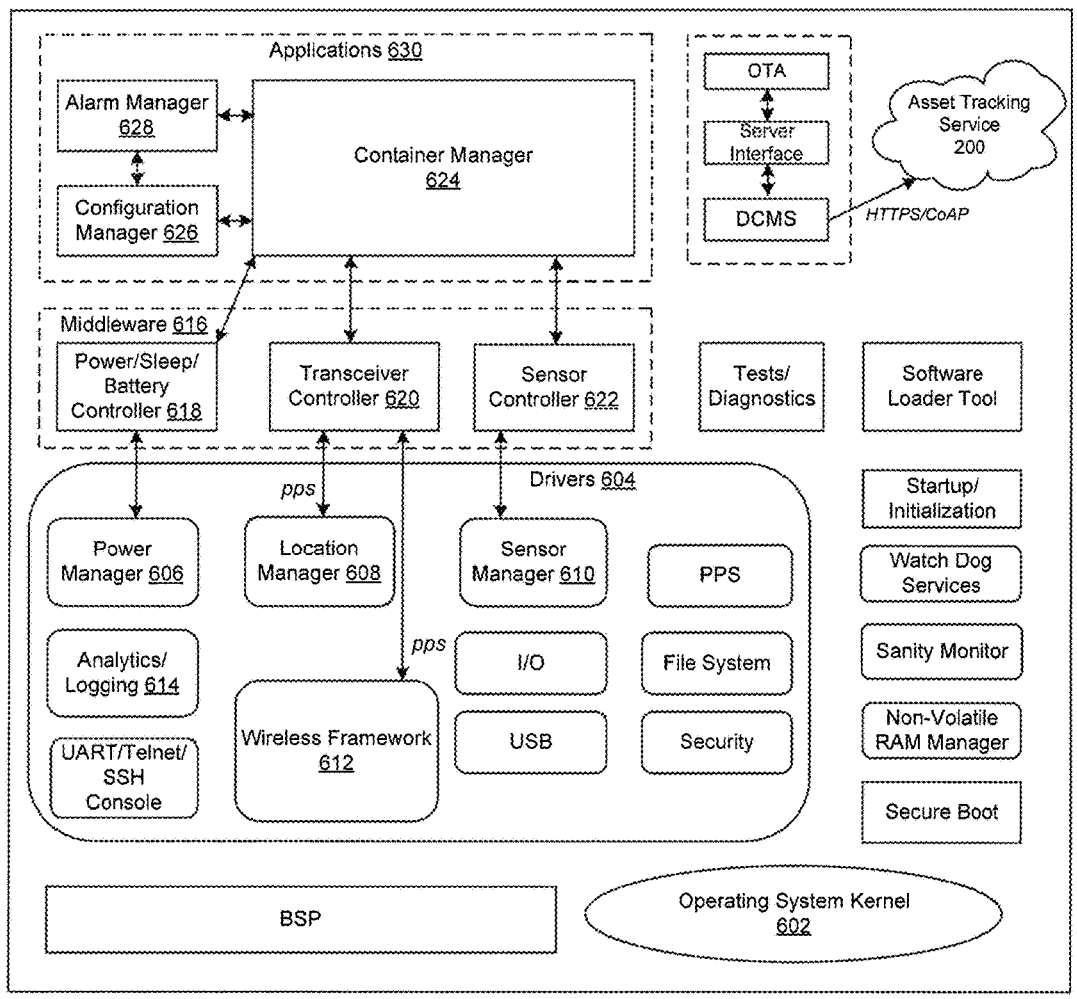
FIG. 6 is a block diagram of the software architecture of the mobile transceiver in accordance with the example embodiments of the present disclosure.

FIG. 6 is a block diagram of the software architecture of the mobile transceiver in accordance with the example embodiments of the present disclosure. The processor 104 may perform a number of processes using the stored software I in the memory 112 by interfacing with various hardware components of the mobile transceiver 102 as shown in the example of FIG. 6. The software modules include an operating system kernel 602, drivers 604, middleware 616 and applications 630. The drivers 604 include a power manager 606, a location manager 608, a sensor manager 610, a wireless framework 612, and an analytics/data logging module 614. The middleware 616 includes a power/battery/sleep controller 618, transceiver controller 620, and sensor controller 622. A number of applications 630 execute on top of the operating system kernel 602 such as a container manager (asset manager) 626, a configuration manager 626 and an alarm manager 628, as described in further detail below.

The container manager 624 collects and packetizes data collected by the mobile transceiver 102, and sends it to the asset tracking service 200 through a server agent interface. The packetized data may use JSON (JavaScript Object Notation) formatting. The container manager 624 may also receive data from the asset tracking service 200 through the asset tracking service 200, which it processes or dispatches to the appropriate module. For example, received device configuration data is dispatched to the configuration manager 626.

The container manager 624 also receives notifications (events) from the server agent interface about network status. For example, whether all data has been transmitted and received by the asset tracking service or whether new data has been received from the asset tracking service.

Events received from the alarm manager 628 include instructions as to what data needs to be gathered and sent to the asset tracking service 200. The container manager 624 follows the instructions received from the alarm manager 628 and collects and packetizes the data that is then transmitted to the asset tracking service 200. For example, an alarm event may specify that location, temperature, humidity and light level should be collected and sent to the asset tracking service 200.

Any data that is not received by the asset tracking service 200 is saved in the file system in memory 112 and an attempt to send the queued data may be made the next time an alarm is triggered and communication is established to the asset tracking service 200. The amount of queued data is based on the capacity of the memory 112. Once the memory 112 is full, older data is overwritten. In some embodiments, the backup data allows storage of 100,000 events with each event having a size approximately equal to 1 KB. The total amount of memory 112 may be 100 MB. The asset tracking service 200 acknowledges any received data so that the mobile transceiver 102 may discard acknowledged data. Alternatively, the data may be maintained within the memory 112, for example, for diagnostic purposes until overwritten.

The container manager 624 also controls the wireless transceivers and satellite receiver 120 through the middleware layer, for example, using a Persistent Publish/Subscribe (PPS) interface provided by the wireless framework, such as that provided by QNX Software Systems Limited.

In some embodiments, virtual sensors are provided. For example, "door" and "contents" sensors may be virtual in that to obtain door open/close status several physical sensors 130, such as accelerometer 136 and light sensor 131 may be used with an algorithm that detects the condition. The same may apply for contents full, empty or half condition. This value depends on an algorithm that considers the container dimensions and readings from the ToF sensor 137. As a result, not all "sensor" data transmitted to the asset tracking service 200 may not be raw readings obtained from physical sensors 130. Instead, some of the sensor data is converted by software on the mobile transceiver and converted to container conditions such as door state, container contents, etc. while other sensor data, such as temperature and humidity is directly obtained from physical sensors 130.

The configuration manager 626 receives, parses and stores device configuration data which stores an alarm profile, and receives and stores the container profile which includes data about the container to which the mobile transceiver 102 is attached. The device configuration data and container profile data may also be stored in the JSON format, and may be compressed and/or encrypted. The encryption/decryption and compression/decompression, if any, is done by the server agent interface and asset tracking service 200. The configuration manager 626 also validates any new device configuration data received from the asset tracking service 200 and reports back any errors.

The assigned device configuration data may be stored in the file system whereas the default device configuration is stored in ROM. Therefore, if the software is re-flashed this would completely update the file system and delete any assigned device configuration that have been downloaded and stored in the file system, which would then have to be obtained from the asset tracking service 200. An OTA update would not delete the configuration files saved in the file system as it uses a patching method to update files.

The alarm manager 618 receives the alarm profile from the configuration manager 626, and sets the alarms based on the active alarm profile. When a new device configuration is received by the configuration manager 626, it informs the alarm manager 628 so that the new alarm profile is applied. The old alarm profile may be deleted.

RTC 160 and at least some of the sensors 130 produce interrupts based on the programmed triggers which wakeup the processor 104. Sensors which do not produce interrupts cannot wakeup the processor 104. Instead, such sensors, when associated with an enabled alarm of the active alarm profile, are polled every time the processor 104 wakes up due to any of the other alarm types.

The RTC 160 is used for date-based and time-based alarm since it runs even when the mobile transceiver 102 is in deep sleep mode. The RTC 160 is configured with the next possible alarm date/time selected by the alarm manager 628 by searching all date and time alarms. Once the next date/time trigger is set in the RTC 160, it will generate an interrupt to wake up the processor 104 when the date/time is reached. It is possible for two or more date/time alarms to fall on the same calendar date and time. In such cases, when the RTC 160 may interrupt fire and the alarm manager 628 executes the instructions for all the matching date/time alarms. It is possible for the next date or time alarm to be due while processing an RTC interrupt generated alarm. For example, this can occur if the processing for a date alarm takes 3 minutes but the next time alarm is in 2 minutes. In such cases, the alarm manager 628 process the due alarm, as if it had triggered an interrupt, before programming the RTC 160 with the next date/time.

For maximum flexibility date-based and time-based alarms may be specified in local time based on container current location, specified using UTC time (Coordinated Universal Time), for example, as defined by International Telecommunications Union Recommendation (ITU-R TF.460-6). For simplicity, alarms may be limited to UTC time. To simplify time tracking, the RTC may be programmed with UTC time with all alarm events should be configured in UTC time. Time may be specified in 24 hr time hh:mm:ss format and date may be specified in dd:mm:yyyy format. Alternatively, date-based and time-based alarms may be specified in a given time zone, for example, the time zone for the customer headquarters. When local time is supported, UTC time can be converted to local time based on the time zone in which the container is located for RTC setup (for example, based on the time zone indicated by the cellular network) and alarm processing.

The alarm manager 628 configures the interrupt capable sensors based on the active alarm profile and possibly the enabled/disable status of the alarms in the active alarm profile, if supported. The sensors send an interrupt signal to wake up the alarm manager 628 when a trigger condition is detected. The alarm manager 628 wakes up and handles the interrupt, sending the corresponding event to the container manager 624 with the action instructions.

It is possible for two or more sensor alarms to be triggered at the same time, since a sensor value may satisfy the condition parameters for more than one alarm. In such cases, the alarm manager gathers the action instructions for all the matching alarms.

Nested alarm interrupts are also possible. For example, while processing an interrupt from the RTC 160 or sensor 130 another interrupt may be triggered. The alarm manager 628 handles each interrupt by queueing the interrupt requests and processing the requests in order. To facilitate processing and avoid endless loops, interrupts being processed may be acknowledged and re-enabled only after all processing is completed. After processing all triggered alarms, the alarm manager 628 may examine future alarm events and choose to process the future alarm events if scheduled to happen within a short period of time. This avoids waking up shortly after going to deep sleep.

The Power/Sleep/Battery Controller 618 provides the functions for managing the device power, battery and sleep mode, which may be implemented as an API that interfaces with the drivers. The Power/Sleep/Battery Controller 618 comprises three submodules a power manger, a battery manager, and a sleep manager. The power manger performs power management, such as setting correct voltage levels and CPU frequency to save device power consumption based on load.

The battery manager detects that a low battery level has been reached and the remaining expected battery life is below a critical threshold. When below the critical threshold, this condition will be sent to the asset tracking service 200. The battery manager may also provide a fuel gauge which provides battery status, charge level percentage, current voltage, consumption rate, expected life expectancy, etc. Alternately, if no fuel gauge is available, the battery manager will provide whatever information can be obtained, if any, for example, by reading the voltage level if possible.

The sleep manager performs the setting of the hardware into sleep mode. The container, configuration and alarm managers inform the sleep manager whether the modules are active or idle by using an API provided by the sleep manager. For this purpose, a shared memory semaphore, a shared memory bit map, an API interface, etc. may be used. Activity on the data port 122 indicates that a manufacturing tests and/or user debugging is being run, and that mobile transceiver 102 should not go to sleep.

To enter sleep in some embodiments, the wireless transceivers are powered off, some sensors may be powered off (for example, if there are no enabled alarms currently triggering on them), watchdog functions are disabled, the RTC 160 is to run and the device is set to run using the low speed clock, and the processor is set to sleep. The satellite receiver 120 is kept awake. Alternatively, the satellite receiver 120 may be powered off.

The alarm manager 628 sends the event to end sleep. Alarms triggered by interrupts are used to wake up the processor 104 from sleep. To complete the wake up, an event or a software interrupt is sent from the alarm manager 628 to the sleep manager. The container manager 624 and the configuration manager 626 inform the sleep manager that the modules are active as soon as events are received and the modules are waken up. When all processing has been completed by the modules, the modules send notifications to the sleep manager 628 that the modules have completed processing and ready to sleep.

To exit sleep in some embodiments, the wireless transceivers are powered on, some sensors that were powered off are powered on if needed by the active alarm profile, watchdog functions are enabled if needed, the RTC 160 is to run, the device is set to run using the high speed clock, and the processor is awaken. The satellite receiver 120 may be awaken if powered off and if needed.

Alternatively, the wireless transceivers power on/off determination could be implemented in the container manager 626 since it will know when the wireless transceiver is needed and when it may be turned off.

Signal Strength Databases

Embodiments of the shared signal strength database 220 and private signal strength database 222 will now be described in more detail. The signal strength databases 220, 222 each include a set of records correlating cellular signal strength with GNSS coordinates (e.g., GPS coordinates).

The signal strength database 220 may be generated or populated from data obtained by individual mobile transceivers 102 which is stored in the private signal strength database 222 of the mobile transceivers 102. Individual mobile transceivers 102 store cellular signal strength information which is measured when attempting to connect to a cellular RAN after obtaining a location fix with the satellite receiver 120. This may occur, for example, during a reporting cycle. The cellular signal strength information is stored in the private signal strength database 222 in the internal memory 112 of the mobile transceiver 102 with a corresponding GNSS coordinate associated with the location at which the cellular signal strength information was determined. The mobile transceivers 102 may also store additional information in the private signal strength database 222.

Each record in the private signal strength database 222 includes at least one signal strength indication and a corresponding GNSS coordinate associated with the location at which the at least one signal strength indication was determined. The signal strength indication may be a received signal strength indicator (RSSI), reference signal received power (RSRP), reference signal received quality (RSRQ) or received signal code power (RSCP) depending on the type of cellular transceiver 114 and the type of cellular networks available.

The records in the private signal strength database 222 may also include additional information, depending on the embodiment. The additional information may be included in some or all of the records in the private signal strength database 222. The additional information may include one or more of a cell ID associated with a respective cellular tower, a network identifier for identifying a respective cellular network associated with the respective cellular tower, or a descriptor identifying a type of the respective cellular network. The network identifier may comprise a wireless carrier name associated with respective cellular RAN (e.g., Verizon™, T-Mobile™ or Vodafone™). The descriptor may comprise a name of the respective cellular RAN type, such as one of the example cellular technology names described above (e.g., LTE).

The additional information may also include one or more of a list of frequency bands associated with the respective cellular tower and/or cellular network, a list of frequencies used by the respective cellular tower and/or cellular network or a measure of the signal quality/cleanliness (such as a signal-to-noise ratio). The measure of the quality/cleanliness may be EC/IO or equivalent. EC/IO is a measure of the quality/cleanliness of the signal from the tower to the mobile transceiver 102 and indicates the signal-to-noise ratio. EC/IO or an equivalent measure may be included in at least some of the records, depending on the embodiment.

Whether the private signal strength database 222 includes additional information, the content of the additional information, and which records include additional information depends on the type of cellular transceiver 114 and the information the mobile transceiver 102 is configured to store.

The mobile transceiver 102 only stores measured cellular signal strength information obtained by the mobile transceiver 102 when data does not already exists for a given GNSS coordinate in some embodiments. In other embodiments, the mobile transceiver 102 only stores measured cellular signal strength information when the location (e.g., GNSS coordinate) of the mobile transceiver 102 is more than a threshold distance away from a location for which cellular signal strength information is already stored (e.g., 1 mile or 1 km). In yet other embodiments, the mobile transceiver 102 stores all measured cellular signal strength information obtained by the mobile transceiver 102 along with the GNSS coordinates even when data already exists for a given GNSS coordinate. The cellular signal strength information obtained by the mobile transceiver 102 is stored in memory 112 irrespective of whether the mobile transceiver 102 was able to successfully connect to a cellular RAN. In some embodiments, the cellular signal strength information is stored after attempting to connect to a cellular RAN. In such embodiments, the cellular signal strength information may include, for each cellular tower in range, a first indication of whether access was attempted and a second indication of whether a connection was made. For example, the first indication may comprise a counter representing a running total of a number of attempts to connect to respective cellular tower and the second indication may comprise a counter representing a running total of the number of successful connections to the respective cellular tower. In this way, the cellular signal strength information includes past connectivity data about the respective cellular towers, the cellular RANs associated with the respective cellular towers, or both.

In other embodiments, the cellular signal strength information is stored before attempting to connect to a cellular RAN. In such embodiments, past connectivity data is not stored or is added to the relevant records after attempting connection.

Example records of the signal strength database 222 is provided below for illustration.

transceiver 102 sends the private signal strength database 222 to the asset tracking server 200 each time the mobile transceiver 102 connects to the asset tracking server 200.

In other embodiments, the mobile transceiver 102 only sends the private signal strength database 222 to the asset tracking server 200 when a flag or other indication stored in memory, such as the internal memory 112, indicates that the private signal strength database 222 has been updated since the last time the private signal strength database was sent to the asset tracking server 200, if ever. The flag or other indication may be set after each update to the private signal strength database 222, after a threshold number of updates to private signal strength database 222 of any kind, or after a threshold number of updates to private signal strength database 222 of one or more particular types (e.g., data associated with new GNSS coordinates has been added), depending on the embodiment.

Considering whether any update or whether one or more updates to the private signal strength database 222 which meet a reporting threshold have occurred before sending the cellular signal strength information to the asset tracking server 200 reduces the number and frequency of updates with respect to cellular signal strength information sent to the asset tracking server 200, thereby reducing the amount of data sent to the asset tracking server 200 by the mobile transceiver 102, which thereby conserves battery power and network resources.

The shared signal strength database 220 may have the same or a different structure than the private signal strength database 222, depending on the embodiment. Each record in the signal strength database 220 includes at least one signal strength indication and a corresponding GNSS coordinate associated with the location at which the at least one signal strength indication was determined. The records in the signal strength database 220 may also include additional information as described above.

TABLE 1

Cellular Signal Strength Records

| Cell ID | Identifier (Wireless Carrier) | Descriptor (Cellular RAN Type) | RSSI (dBm) | GNSS coordinates | Number of Attempts | Number of Connections |
|---|---|---|---|---|---|---|
| A465 | Rogers | Edge | −50 | 43.158° N 80.766° W | 2 | 2 |
| D892 | Telus | LTE | −75 | 43.158° N 80.766° W | 4 | 1 |
| A465 | Rogers | Edge | −52 | 43.159° N 80.764° W | 2 | 2 |
| D892 | Telus | LTE | −74 | 43.159° N 80.764° W | 4 | 1 |

In the example records of Table 1, each record includes a cell identifier (ID) which uniquely identifies the cellular tower (such as, for example, a GSM Cell ID (CID) is a generally unique number used to identify each base transceiver station (BTS) or sector of a BTS within a location area code (LAC) if not within a GSM network), a network identifier of the wireless carrier associated with the cellular tower, a descriptor of the type of cellular RAN associated with the cellular tower, an RSSI value, GNSS coordinates at which the RSSI information was obtained, a first indication of whether access was attempted, and a second indication of whether the attempt was successful.

Each mobile transceiver 102 periodically sends its private signal strength database 222 stored in internal memory to the asset tracking server 200. In some embodiments, the mobile In one embodiment, the shared signal strength database 220 is an aggregation of the private signal strength databases 222 of a plurality of the mobile transceivers 102. The asset tracking server 200, after receiving the private cellular signal strength information from a particular mobile transceiver 102, updates the shared signal strength database 220 with the private cellular signal strength information. The updating comprises aggregating the private cellular signal strength information from the particular mobile transceiver 102 with the private cellular signal strength information from other mobile transceivers 102.

In another embodiment, the shared signal strength database 220 is an aggregation of the data collected from individual mobile transceivers 102 with other sources of data to increase the amount of the data in the shared signal strength database 220. The other sources of data may be based on cellular signal strength information gathered by cellular phones. The other sources of data may comprise data collected by a wireless carrier associated with both the mobile transceivers 102 and the cellular phones, a wireless carrier not associated with the mobile transceivers 102, or possibly a third party resources, such as a third party database may be accessible over the Internet.

When aggregating data collected by the individual mobile transceivers 102 with other sources of data, it will be appreciated that some of the other sources of data may not be as rich or may not be as trusted as the data collected by the individual mobile transceivers 102. In addition, data obtained from other sources may have a lesser amount of precision in terms of the stored signal strength indication and/or GNSS coordinates. Further still, it is possible that the data obtained from other sources may be missing identifying information concerning the wireless carrier, cellular tower and/or cellular RAN type.

When the shared signal strength database 220 is aggregated with other sources of data, the database 220 may include an indication of the source of the data. The indication of the source of the data may be used by the asset tracking server 200 to filter out and remove sources of data, such as sources of data that are deemed unreliable (e.g., third party data). The mobile transceiver 102 may also use the indication of the source of the data to determine how, or when, to use cellular signal strength information when selecting a cellular RAN for connection.

Whether the signal strength database 220 includes additional information, the content of the additional information, and which records include additional information depends on the type of cellular transceiver 114, information the mobile transceiver 102 is configured to store, and the nature of other sources of data which are aggregated with the data collected by the mobile transceivers 102.

In a further embodiment, the shared signal strength database 220 comprises summary or statistical information about the cellular signal strength information at a given GNSS coordinate based on the aggregation of the private signal strength databases 222 of a plurality of the mobile transceivers 102 and optionally other sources of data as described above. The summary or statistics information may include one or more of a high signal strength value, low signal strength value, average signal strength, mean signal strength, ratio of successful connections to attempts, etc. The summary or statistical information is calculated by the asset tracking server 200 based on the aggregated data. The summary or statistics information may be determined separately for each of the various sources of data, allowing the summary or statistics information to be filtered by the data source. The summary or statistics information may be included as part of the shared signal strength database 220 or may be maintained separately.

The shared signal strength database 220 may include summary or statistical information about the cellular signal strength information in addition to, or instead of, measured signal strength indication information at a given GNSS coordinate. For example, each record in the signal strength database 220 may include an average signal strength indication and a corresponding GNSS coordinate. The summary or statistical information may be based on the measured signal strength indication for one or more multiple towers.

In yet a further embodiment, the shared signal strength database 220 may be based on information derived from the aggregation of the private signal strength databases 222 of a plurality of the mobile transceivers 102 and optionally other sources of data as described above. The derived information may comprise estimated data which may be generated by the asset tracking server 200. For example, the estimated data may comprise estimated signal strength indications for GNSS coordinates for which no data is available using measured data in shared signal strength database 220 and interpolation and/or extrapolation techniques based on signal propagation models. Estimate records may be generated for GNSS coordinates at fixed intervals to fill in gaps in the signal strength database and/or decrease the distance between records. This is illustrated in FIG. 4.

Figure 4:
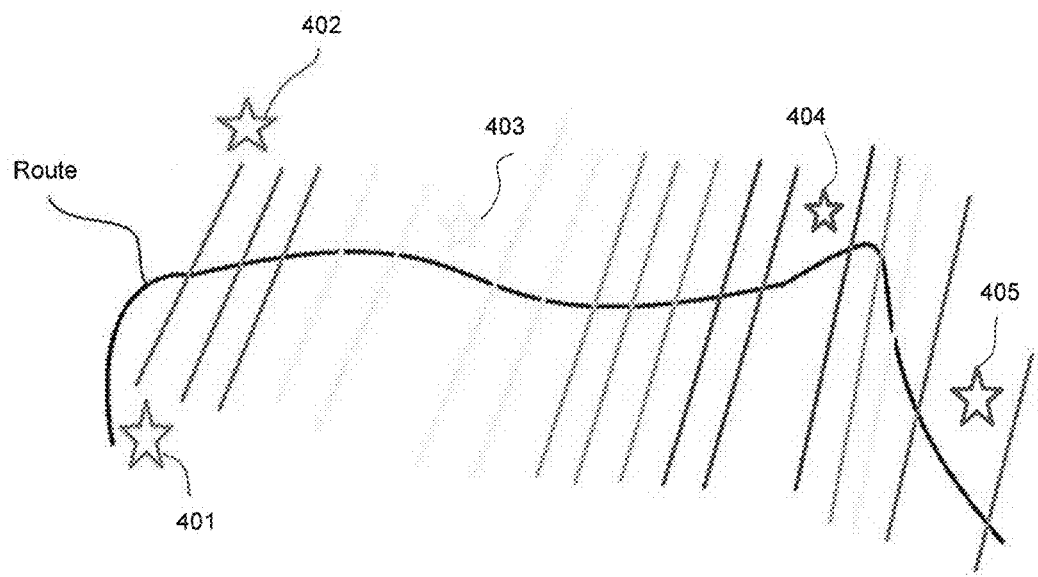
FIG. 4 is a schematic representation of estimated signal strength data along a route.

FIG. 4 shows a schematic representation of estimated signal strength data along a route taken by the mobile transceiver 102. Five coordinates in the signal strength database 220 are shown at 401, 402, 403, 404 and 405. The lines indicate a derived signal strength based on the nearest data points in the signal strength database 200, namely the data points 401, 402, 403, 404 and 405. The derived signal strengths may be no signal, weak signal, average signal or strong signal. The mobile transceiver 102 can use the derived signal strengths in a similar manner to measured signal strength indications.

The derived information may comprise a signal strength rating derived from the average signal strength indication. The signal strength rating may be one of a number of signal strength ratings, such as no signal, weak signal/low signal, average signal/medium signal, or strong signal/high signal. The signal strength rating may be determined by the asset tracking server 200 by comparing the average signal strength indication to signal strength thresholds defining the signal strength ratings. While example qualitative indicators of signal strength ratings have been described, other qualitative indicators could be used in other embodiments, such as a numerical rating from 1 to 10, to provide increase precisions.

The records may include an indication whether to attempt to access cellular service based on the signal strength rating and/or the average signal strength indication. The indication whether to attempt to access cellular service is a positive indication ("yes") or negative indication (e.g., "no").

Rather than each record including a particular GNSS coordinate as described above, each record may include a range of GNSS coordinates. The ranges may be selected to eliminate gaps in signal strength information for a geographic area and to avoid any overlap between ranges.

The derived information assists the mobile transceiver 102 in deciding whether to activate the cellular transceiver 114 and attempt connecting to the cellular network by filling in gaps in the signal strength database 220, pre-processing the signal strength information in the signal strength database 220, and/or pre-determining when to activate the cellular transceiver 114 and attempt connecting to the cellular network. This conserves processing resources and power of the mobile transceiver 102.

When the mobile transceiver 102 is connected to the asset tracking server 200, the mobile transceiver 102 may download the shared signal strength database 220 and store it in memory 112. In some embodiments, the mobile transceiver 102 may download the shared signal strength database 220 each time it connects to the asset tracking server 200 or only the copy of the shared signal strength database 220 in memory 112 that is out-of-date. The currency of the shared signal strength database 220 stored in the memory 112 of the mobile transceiver 102 may be determined by a timestamp, version number or other indication. A comparison of the timestamp, version number or other indication may be performed by the asset tracking server 200 in some embodiments. For example, the timestamp, version number or other indication of the currency of the shared signal strength database 220 stored in the memory 112 of the mobile transceiver 102 may be sent with the asset tracking log 224 during a reporting cycle.

In other embodiments, the updated shared signal strength database 220 is sent to all mobile transceivers 102 managed by the asset tracking server 200 as part of a software or firmware update initiated by a system administrator. The software or firmware update would be performed by the mobile transceivers 102 on the next connection to the asset tracking server 200.

The summary or statistics information, when calculated by the asset tracking server 200, may be downloaded with the shared signal strength database 220, whether the summary or statistics information is included as part of the shared signal strength database 220 or separately maintained.

Alternatively, in other embodiments, a signal strength database may be customized for a mobile transceiver 102 in accordance with a travel itinerary for the mobile transceiver 102 accessible by the asset tracking server 200. The travel itinerary defines a route including number of waypoints including an origin, destination and possibly intermediate waypoints along the intended route. Each waypoint corresponds to a location or geographical area along the intended route. The travel itinerary specifies a GNSS coordinate or range of GNSS coordinates (e.g., GPS coordinates) for each waypoint in the travel itinerary. The travel itinerary may also define an expected time of arrival (ETA) or time period for each waypoint in the travel itinerary, which may be based on the mode of transportation (e.g., rail, ship, boat, truck).

The travel itinerary may also specify a preselected (or predetermined) wireless transceiver for at least some of the waypoints in the travel itinerary. For example, if more than one cellular transceiver 114 is provided. The preselected wireless transceivers are selected by the asset tracking service 200 based on the wireless network availability at the various waypoints. The selection of the wireless transceiver may be based on the signal strength database.

In a long-range application in which the mobile transceiver 102 may be out of wireless coverage for an extended period of time, the mobile transceiver 102 may be configured to wake up to perform data logging, i.e. to obtain a location fix and/or acquire sensor data (e.g., environmental data) at one or more waypoints along the intended route.

An example travel itinerary is provided below in Table 2.

TABLE 2

Example travel itinerary

| Waypoint | GNSS coordinates | Wireless Transceiver | Region | Technology |
|---|---|---|---|---|
| Origin | GNSS range 1 | Transceiver 1 | Asia Pacific | 2G/3G |
| In transit | | GNSS only | | |
| In transit | GNSS range 2 | Transceiver 2 | EMEA | LTE (3G fallback) |
| Destination | GNSS range 3 | Transceiver 3 | North America | LTE |

Each waypoint in the travel itinerary includes a number of parameters including a waypoint descriptor, GNSS coordinates, a preselected wireless transceiver, a geographical region, and a wireless transceiver technology. Not all parameters may be defined for each wakeup event and different parameters may be defined in other embodiments. The available wireless coverage for the particular geographic location and/or a preferred wireless carrier, from a list of available carriers associated with each wireless transceiver (if there is more than one wireless carrier available at the waypoint) may also be specified in the travel itinerary.

The waypoint descriptors in the example travel itinerary include "Origin", "In Transit", and "Destination". However, more detailed waypoints and waypoint descriptors may be provided in other embodiments including, for example, one or more of "Rail", "Ship", "Street", "Dock", "Home", "Warehouse", "Distribution Centre", "Outside" or "Inside". Also, while a geographical region distinct from the waypoint descriptor is provided in the example travel itinerary (e.g., Asia Pacific, Europe, the Middle East and Africa (EMEA), North America, South America, etc.), the geographical region may be omitted in other embodiments. Alternatively, the particular geographic location may be defined in terms of a city name or code, or country name or code. The waypoint descriptors are optional and may be omitted in other embodiments.

While the travel itinerary has been described as including certain data items and having a certain data structure, the present disclosure is not intended to be limited to the described data structure. Any data structure in which the described data items are provided and associated with each other may be used, whether those data items are stored in a travel itinerary or elsewhere.

The asset tracking server 200 generates the customized signal strength database to include a number of records on or near the route are defined by the travel itinerary. When the measured data in the shared signal strength database 220 is more than a threshold distance from the route, the asset tracking server 200 generate estimated data using measured data in shared signal strength database 220 and interpolation and/or extrapolation techniques based on signal propagation models. The customized signal strength database may be pushed to the mobile transceiver 102 before the start of the trip defined by the travel itinerary. The derived information in the customized signal strength database fills in gaps in the shared signal strength database 220 and provides a smaller database to access during use.

Alternatively, in other embodiments, rather than maintaining a private and shared signal strength databases 220, each mobile transceiver 102 may maintain a single signal strength database. The signal strength database may be provided by the asset tracking server 200 or based on previous measurements by the mobile transceiver 102.

Example Method of Operating a Mobile Transceiver

Figure 3:
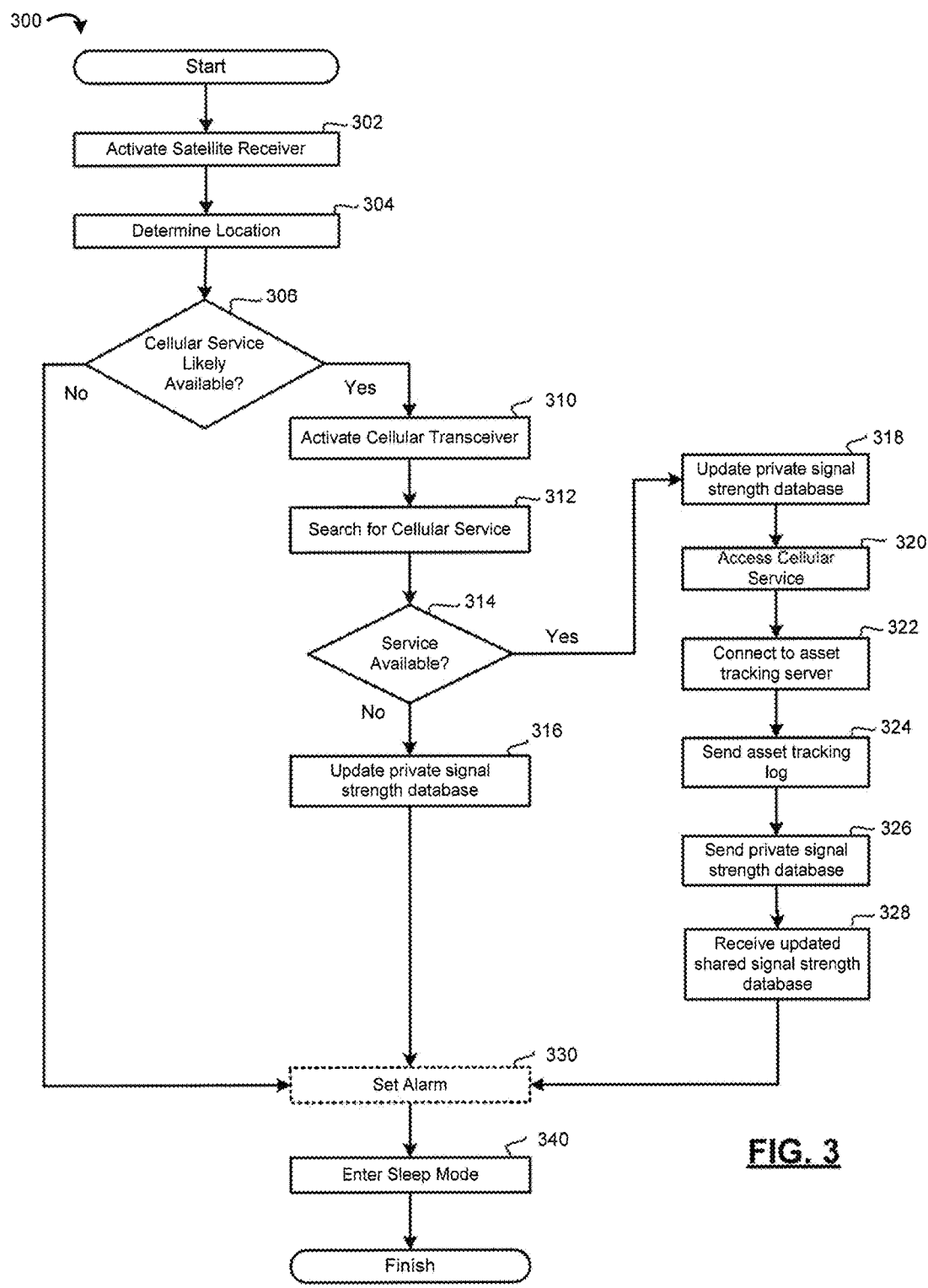
FIG. 3 is a flowchart illustrating an example embodiment of a method of operating a mobile transceiver in accordance with one embodiment of the present disclosure.

FIG. 3 is an example flowchart of a method 300 of operating a mobile transceiver 102 such as a GNSS tracking device in accordance with one example embodiment of the present disclosure. The method may be carried out by software executed by a processor of the respective devices. Coding of software for carrying out such a method 300 is within the scope of a person of ordinary skill in the art provided the present disclosure. The method 300 may contain additional or fewer processes than shown and/or described, and may be performed in a different order in other embodiments. Machine readable code executable by the processor to perform the method 300 may be stored in a machine readable medium such as a memory.

At 302, the mobile transceiver 102 wakes up from a low power mode in response to an alarm and activates the satellite receiver 120. An alarm is a configurable wakeup event which causes the mobile transceiver 102, or a subsystem of the mobile transceiver 102 such as the satellite receiver 120 or one or more sensors 130, to wake up from a low power mode such as a sleep mode and perform configured actions (e.g., performs measurements of location and sensors) which are then logged and/or reported to the asset tracking server 200.

Alarms are defined by a trigger type, a trigger condition to be satisfied for the alarm to be triggered, and one or more actions to take when the alarm is triggered. The alarm types are date-based, time-based or sensor-based. Alarms may be active (enabled) or inactive (disabled) and alarms may be enabled or disabled by other alarms that have been triggered. For example, if the temperature surpasses a trigger point, another alarm may be enabled to trigger if the temperature decreases below a lower value. Disabled/inactive alarms are ignored. In the described example the alarm may be a date-based or time-based alarm which wakes up the processor 104 and possibly other subsystems at a fixed time or at regular intervals among other possibilities. The frequency or schedule at which the location is determined may be fixed or configurable.

Optionally, upon wakeup the mobile transceiver 102 may sense the environment around it using the sensors 130, and uses the sensed data to determine whether it is likely that a satellite signal is available, and only activate the satellite receiver 120 when it is determined to be likely that a satellite signal is available. When it is determined to be unlikely that a satellite signal is available, the mobile transceiver 102 returns to the low power mode.

At 304, the mobile transceiver 102 determines its location using the satellite receiver 120. The mobile transceiver 102 uses signals received by the satellite receiver 120 from a plurality of satellites in the satellite network 180 to determine its location. The mobile transceiver 102 stores the determined location, typically in terms of latitude and longitude, and a time at which the location was determined in a data log stored in the memory 112 of the mobile transceiver 102.

At 306, the mobile transceiver 102 determines whether a cellular service is likely to be available at the determined location based on a signal strength database 220 stored in the memory 112. In one example embodiment, determining whether cellular service is likely to be available at the determined location comprises identifying a record in the signal strength database nearest to the determined location. Next, it is determined whether a signal strength indication in the identified record is equal to or greater than a signal strength threshold. When the signal strength indication in the identified record is equal to or greater than the signal strength threshold, the cellular service is likely to be available at the determined location. When the signal strength indication in the identified record is less than the signal strength threshold, the cellular service is unlikely to be available at the determined location In another example embodiment, determining whether cellular service is likely to be available at the determined location comprises identifying one or more records in the signal strength database within a threshold distance of the determined location. Next, the signal strength at the determined location is estimated using the signal strength indication in the one or more identified records. Next, it is determined whether the estimated signal strength is equal to or greater than a signal strength threshold. When the estimated signal strength is equal to or greater than signal strength threshold, the cellular service is likely to be available at the determined location. When the estimated signal strength is less than signal strength threshold, the cellular service is unlikely to be available at the determined location.

In a further example embodiment, determining whether cellular service is likely to be available at the determined location comprises identifying a record in the signal strength database nearest to the determined location. Next, it is determined whether a signal strength rating in the identified record is equal to or greater than a signal strength rating threshold or minimum (e.g., a medium strength signal). Next, when the signal strength rating in the identified record is equal to or greater than a signal strength rating threshold (e.g., a medium strength signal or better), the cellular service is likely to be available at the determined location. When the signal strength rating in the identified record is less than signal strength rating threshold (e.g., low strength signal or worse), the cellular service is unlikely to be available at the determined location.

In yet a further example embodiment, determining whether cellular service is likely to be available at the determined location comprises identifying a record in the signal strength database nearest to the determined location. Next, it is determined whether an indication whether to attempt to access cellular service rating in the identified record is positive or negative. When the indication whether to attempt to access cellular service is positive, cellular service is likely to be available at the determined location. When the indication whether to attempt to access cellular service is negative, cellular service is unlikely to be available at the determined location.

When the records in the signal strength database include a signal strength indication and a range of GNSS coordinates associated with the signal strength indication, identifying the record in the signal strength database nearest to the determined location comprises identifying the record having a range of GNSS coordinates that includes the GNSS coordinate of the mobile transceiver.

When it is determined cellular service is likely to be unavailable at the determined location, processing proceeds to 340 at which a low power mode is initiated for the satellite receiver 120 and possibly other subsystems, such as the sensors 130. Before the low power mode is initiated, the mobile transceiver 102 may collect environmental data. This typically comprises the mobile transceiver 102 sensing, via one or more of the sensors 130, an environment of the mobile transceiver 102, and storing the sensor data obtained via the sensors 130 and a time at which the sensor data was obtained in the data log stored in the memory 122. Alternatively, the environmental data may be collected earlier, such as before the satellite receiver 120 is activated.

At 310, when it is determined cellular service is likely to be available at the determined location, the mobile transceiver 102 activates the cellular transceiver 114 from a low power mode, such as a sleep mode. The activating of the last wireless transceiver may be performed by the main processor 104 or a baseband processor (not shown) of the cellular transceiver 114, depending on the embodiment.

At 312, the cellular transceiver 114 searches (e.g., scans) for cellular service by searching for cellular signals. The cellular transceiver 114 may search for cellular signals in accordance with a priority sequence of frequencies based on the shared signal strength database 220. The priority sequence may be based on a priority sequence of cellular towers. The priority sequence of cellular towers may be based on signal strength indications and/or additional when data for individual towers is maintained in the shared signal strength database 220. Alternatively, the priority sequence may be based on preferred carriers, for example, frequencies used by the carrier of the user's home network and/or carriers that have an advantageous partnering agreement with the carrier of the user's home network. The priority sequence may be a list of frequencies sorted or ranked in a descending order of priority. The scanning comprises measuring signal strength indications associated with one or more signals received from one or more respective cellular towers.

At 314, the mobile transceiver 102 determines whether cellular service is available in accordance with any responses received in response to scanning for frequencies.

At 316, when cellular service is not available, the mobile transceiver 102 updates the private signal strength database 222 to indicate that no signal was detected at the determined location of the mobile transceiver, for example.

At 318, when cellular service is available, the mobile transceiver 102 also updates the private signal strength database 222 by storing the at least the determined signal strength indications and the determined location of the mobile transceiver. Additional information may also be stored, such as one or more of a cell ID of a respective cellular tower, a network identifier for identifying a respective cellular network associated with the respective cellular tower, a descriptor identifying a type of the respective cellular network, a list of frequency bands associated with the respective cellular tower and/or cellular network, a list of frequencies used by the respective cellular tower and/or cellular network or a measure of the signal quality/cleanliness.

At 320, the mobile transceiver 102 accesses (or connects) to the cellular service. If more than one cellular service is available, the mobile transceiver 102 selects one of the cellular services based on selection criteria, such as the signal strength indication. For example, the cellular service having the highest signal strength indication may be selected.

At 322, the mobile transceiver 102 connects to the asset tracking server 200. At 324, the mobile transceiver 102 sends the asset tracking log 224 to the asset tracking server 200. At 326, the mobile transceiver 102 sends the private signal strength database 222 to the asset tracking server.

While 324 and 326 are shown as separate logical blocks in FIG. 3, it will be appreciated that the asset tracking log 224 and private signal strength database 222 may be sent to the asset tracking server 200 at the same time.

In some embodiments, after the asset tracking server 200 has received the asset tracking log 224 and private signal strength database 222, a confirmation message is sent by the asset tracking server 200 to the mobile transceiver 102 indicating that the data has been successfully received or uploaded to the asset tracking server 200. The mobile transceiver 102, on receiving the confirmation message, then clears the asset tracking log 224 and private signal strength database 222 from the memory 112. This conserves memory and facilitates "smart" uploads from the mobile transceiver 102 in which only new data is uploaded to the asset tracking server 200. In other embodiments, a separate confirmation message is sent for each of the asset tracking log 224 and private signal strength database 222. In other embodiments, no confirmation messages are sent.

At 328, the mobile transceiver 102 receives a copy of the updated shared signal strength database 220 from the asset tracking server 200. In other embodiments, the mobile transceiver 102 may receive a copy of the updated shared signal strength database 220 at another time, as described above.

At 340, a low power mode is initiated for the mobile transceiver 102 as described above.

Optionally, at 330 before entering a low power mode, one or more alarms may be set based on the signal strength at the determined location. The alarms may be new alarms or existing alarms which are adjusted based on the signal strength. For example, a time-based alarm may be decreased in frequency when the mobile transceiver 102 is travelling through an area of poor reception that was not expected (e.g., change alarm from every 10 mins to every 1 hour) or may be increased in frequency when the mobile transceiver 102 is travelling through an area of good reception that was not expected (e.g., change alarm from every 1 hour to every 10 minutes).

For another example, date-based or time-based alarms having actions that involve the cellular transceiver 114 may be adjusted based on the signal strength at the determined location and a determination of the speed at which the mobile transceiver 102 is moving. The speed of travel may be determined or calculated using location data obtained from the satellite receiver 120 or the asset tracking log 224. The speed may be determined using one of many different techniques based on the satellite receiver 120 and/or sensors 130. For example, the speed may be determined in real-time using the satellite receiver 120. In another example, the speed may be determined using a change in GNSS coordinates between the current alarm and the previous alarm and the time of the current alarm and previous alarm and optionally the route taken by the mobile transceiver 102, which may be specified by the travel itinerary. This approach may be advantageous over a real-time determination because it provides a longer time average of the travelling speed. However, this approach assumes a linear path between alarms/wakeups which, over longer periods of time, introduces error. Taking the route into account, for example, by calculating (or approximating) displacement between points along the route rather than the linear distance between GNSS coordinates may reduce the error in calculating speed. When the determined location does not correspond to a location in the travel itinerary, the location in the travel itinerary closed to the determined location may be used.

Next, the processor 104 identifies one or more waypoints in a travel itinerary at which cellular service is likely to be available at the determined location based on the determined location and the signal strength database. Next, the processor 104 determines one or more estimated time of arrivals (ETAs) at the identified one or more of the next waypoints based on the calculated speed. The processor 104 then uses the determined ETAs to set or adjust one or more alarms to be triggered, which may be date-based or time-based alarms involving the cellular transceiver 114.

For alarms involving the cellular transceiver 114 (alarms with reporting actions), the alarms may be set to coincide with the ETA at a location for which cellular service is likely, as noted above. The mobile transceiver 102 may calculate an ETA at the immediately next waypoint, a number of future waypoints in the travel itinerary, or all remaining waypoints between the determined location and the destination. It will be appreciated that the greater the number of waypoints for which an ETA is calculated, the more error may be introduced. However, if the ETAs are recalculated at every wakeup and the alarms adjusted at every wakeup, the error associated with the next waypoint may be kept relatively low.

It will be appreciated that adjusting future alarms based on signal strength of determined location as described above increases the likelihood that when the cellular transceiver 114 is activated from a low power mode that connection to a cellular network will be successful, thus saving power that would be wasted on activating the cellular transceiver 114 when connection to a cellular network is unlikely to be successful.

While the satellite receiver 120 is used to determine location in the described embodiment, it is contemplated that other means could be used in other embodiments. Moreover, a subjective location determination may be made in some embodiments rather than a geolocation. For example, a camera could be used to capture an image, and the image may be used to determine a subjective location using image recognition techniques. For example, the image may be used to determine whether the mobile transceiver 102 is near a roadside or other location at which a cellular service is likely.

Example Method of Populating a Shared Signal Strength Database

Figure 5:
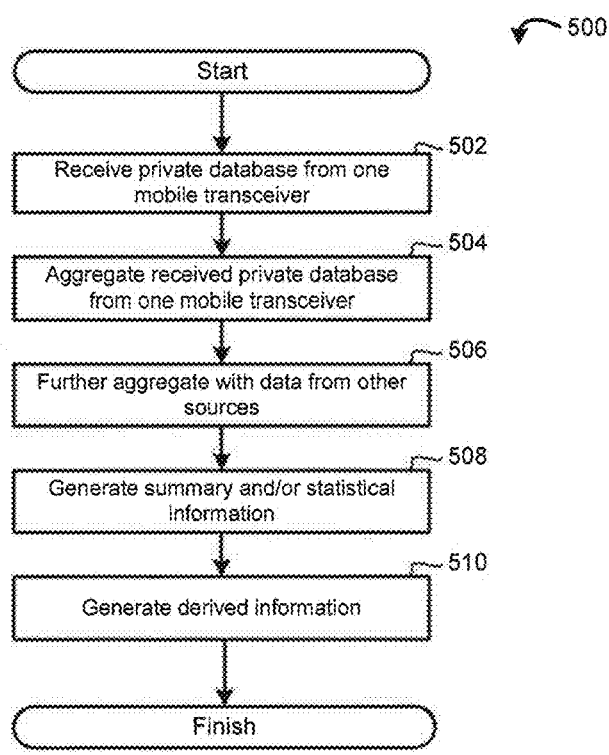
FIG. 5 is a flowchart illustrating an example embodiment of a method of generating a shared signal strength database in accordance with one embodiment of the present disclosure.

FIG. 5 is an example flowchart of a method 500 of generating a shared signal strength database 220. The method may be carried out by software executed by a processor of the respective devices. Coding of software for carrying out such a method 500 is within the scope of a person of ordinary skill in the art provided the present disclosure. The method 500 may contain additional or fewer processes than shown and/or described, and may be performed in a different order in other embodiments. Machine readable code executable by the processor to perform the method 500 may be stored in a machine readable medium such as a memory.

At 502, the asset tracking server 200 receives a private signal strength database sent from a mobile transceiver 102.

At 504, the asset tracking server 200 aggregates the private signal strength database received in 502 with private signal strength databases from other mobile transceiver 102 to obtain a first aggregate data set.

At 506, the asset tracking server 200 optionally further aggregates the first aggregate data set with one or more other data sources to obtain a second aggregate data set.

At 508, the asset tracking server 200 optionally generates summary or statistical information based on the first aggregate data set or second aggregate data set.

At 510, the asset tracking server 200 optionally generates derived information based on the first aggregate data set, second aggregate data set and/or summary or statistical information.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The above-described methods provide power efficient global and long-range tracking methods that reduce power consumption and extend the expected life of the battery of the mobile transceiver. As noted above, the mobile transceiver typically has a cyclical operation of sleep and wake states. The wake state typically involves obtaining and/or processing sensor data, fetching a GPS location, and transmitting data to an asset tracking server 200 (or service) via a cellular network. Transmission of the cellular data is typically the most power consuming event. It involves booting up the cellular transceiver 114, locating a cellular network, establishing a connection to the cellular network, and establishing a connection to the asset tracking server 200 and transmitting the necessary data. The present disclosure provides a power saving scheme for network access in which a signal strength database is maintained by the mobile transceiver 102 and the cellular transceiver 114 is only activated when signal strength database indicates a connection is likely. This avoids unnecessarily wasting power by activating (e.g., booting) cellular transceiver 114 when there is weak or no coverage. The cellular transceiver 114 also enters a low power mode (e.g., shuts down) if it is activated because the signal strength database indicates a connection is likely but a connection cannot be made. This avoids the unnecessarily wasting power by re-trying to establish the cellular network connection. The signal strength database may also be updated when a connection is expected but a connection cannot be made.

While the described embodiments related to a cellular signal strength database for use with the cellular transceiver, the teachings of the present disclosure could be applied to other wireless radio access technologies such as, for example, Wi-Fi. In one example, the signal strength database may be a wireless signal strength database for use with the wireless transceiver 116, with the signal strength database based on the signal strength of wireless access points in a wireless network conforming to the IEEE 802.11p standard. The wireless access points may be located along roadsides or elsewhere. IEEE 802.11p is an approved amendment to the IEEE 802.11 standard that adds wireless access in vehicular environments (WAVE), a vehicular communication system. It defines enhancements to 802.11 that support Intelligent Transportation Systems (ITS) applications, including data exchange between high-speed vehicles and between the vehicles and roadside infrastructure in the licensed ITS band of 5.9 GHz (5.85-5.925 GHz). IEEE 1609 is a higher layer standard based on the IEEE 802.11p.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of operating a mobile transceiver, the mobile transceiver comprising a processor, and a memory, satellite receiver and cellular transceiver each coupled to the processor, the method comprising:

activating the processor and the satellite receiver from a low power mode in response to an alarm while maintaining the cellular transceiver in a low power mode;

determining, via the satellite receiver, a current location of the mobile transceiver;

determining, by the processor, whether cellular service is likely to be available at the current location based on a signal strength database stored in the memory by identifying a record in the signal strength database nearest to the current location, each record in the signal strength database including a signal strength indication and a location associated with the signal strength indication;

determining that cellular service is likely to be available at the current location in response to a determination that the signal strength indication in the identified record is equal to or greater than the signal strength threshold;

determining that cellular service is unlikely to be available at the current location in response to a determination that the signal strength indication in the identified record is less than the signal strength threshold;

activating the cellular transceiver from a low power mode in response to a determination that cellular service is likely to be available at the current location; and switching the satellite receiver into the low power mode in response to a determination that cellular service is unlikely to be available at the current location.

2. The method of claim 1, wherein determining a location of the mobile transceiver using the satellite receiver comprises determining a GNSS coordinate of the mobile transceiver, wherein the signal strength database comprises a plurality of records, each record in the signal strength database including a signal strength indication and a range of GNSS coordinates associated with the signal strength indication, wherein identifying the record in the signal strength database nearest to the current location comprises identifying the record having a range of GNSS coordinates that includes the GNSS coordinate of the mobile transceiver.

3. The method of claim 1, further comprising:
searching for cellular service;
measuring signal strength indications associated with one or more signals received from one or more respective cellular towers; and
updating a private signal strength database with the determined signal strength indications and the current location of the mobile transceiver.

4. The method of claim 3, wherein the updating comprises updating the signal strength database with one or more of a cell ID associated with a respective cellular tower, a network identifier for identifying a respective cellular network associated with the respective cellular tower, and a descriptor identifying a type of the respective cellular network.

5. The method of claim 4, wherein the updating comprises updating the signal strength database with one or more of a list of frequency bands associated with the respective cellular tower, a list of frequencies used by a respective cellular tower or a measure of signal quality/cleanliness.

6. The method of claim 1, further comprising:
attempting to connect to one or more of cellular networks associated with the one or more cellular towers from which the one or more signals were received;
wherein the updating comprises updating the private signal strength database, for each cellular tower from which the one or more signals were received, a first indication of whether access was attempted and a second indication of whether a connection was made.

7. The method of claim 1, further comprising:
connecting to an asset tracking server;
sending a private signal strength database to the asset tracking server for updating the shared signal strength database;

receiving an updated shared signal strength database from the asset tracking server.

8. The method of claim 1, wherein determining a location of the mobile transceiver using the satellite receiver comprises determining a GNSS coordinate of the mobile transceiver, wherein the signal strength database comprises a plurality of records, each record in the signal strength database including a signal strength indication and a GNSS coordinate associated with the location at which the signal strength indication was determined.

9. The method of claim 1, further comprising:
setting one or more future alarms in accordance with whether cellular service is likely to be available at the current location.

10. The method of claim 1, further comprising:
calculating a speed of travel using location data obtained from the satellite receiver or an asset tracking log;
identifying one or more waypoints in a travel itinerary at which cellular service is likely to be available at the current location based on the signal strength database;
determining one or more estimated time of arrivals (ETAs) at the identified one or more waypoints based on the calculated speed; and
setting one or more alarms to be triggered at the one or more ETAs.

11. The method of claim 10, wherein the one or more alarms are time-based or date-based alarms.

12. A mobile transceiver, comprising:
a processor;
a satellite receiver coupled to the processor; and
a cellular transceiver coupled to the processor;
a memory coupled to the processor, the memory storing executable instructions that, when executed by the processor, cause the mobile transceiver to:
activate the processor and the satellite receiver from a low power mode in response to an alarm while maintaining the cellular transceiver in a low power mode;
determine, via the satellite receiver, a current location of the mobile transceiver;
determine, by the processor, whether a cellular service is likely to be available at the current location based on a signal strength database stored in the memory by
identifying a record in the signal strength database nearest to the current location, each record in the signal strength database including a signal strength indication and a location associated with the signal strength indication;
determining that cellular service is likely to be available at the current location in response to a determination that the signal strength indication in the identified record is equal to or greater than the signal strength threshold;
determining that cellular service is unlikely to be available at the current location in response to a determination that the signal strength indication in the identified record is less than the signal strength threshold;
activate the cellular transceiver from a low power mode in response to a determination that cellular service is likely to be available at the current location; and
switch the satellite receiver into the low power mode in response to a determination that cellular service is unlikely to be available at the current location.

13. The mobile transceiver of claim 12, wherein the executable instructions, in response to a determination that determining whether cellular service is likely to be available at the current location comprises, cause the mobile transceiver to calculate a speed of travel using location data obtained from the satellite receiver or an asset tracking log; identify one or more waypoints in a travel itinerary at which cellular service is likely to be available at the current location based on the signal strength database; determine one or more estimated time of arrivals (ETAs) at the identified one or more waypoints based on the calculated speed; and set one or more alarms to be triggered at the one or more ETAs.

14. A non-transitory machine readable medium having tangibly stored thereon executable instructions for execution by a processor of a mobile transceiver, the mobile transceiver comprising a memory, a satellite receiver, and a cellular transceiver each coupled to the processor, wherein the executable instructions, when executed by the processor, cause the mobile transceiver to:

activate the processor and the satellite receiver from a low power mode in response to an alarm while maintaining the cellular transceiver in a low power mode;

determine, via the satellite receiver, a current location of the mobile transceiver;

determine, by the processor, whether a cellular service is likely to be available at the current location based on a signal strength database stored in the memory by identifying a record in the signal strength database nearest to the current location, each record in the signal strength database including a signal strength indication and a location associated with the signal strength indication;

determining that cellular service is likely to be available at the current location in response to a determination that the signal strength indication in the identified record is equal to or greater than the signal strength threshold;

determining that cellular service is unlikely to be available at the current location in response to a determination that the signal strength indication in the identified record is less than the signal strength threshold;

activate the cellular transceiver from a low power mode in response to a determination that cellular service is likely to be available at the current location; and switch the satellite receiver into the low power mode in response to a determination that cellular service is unlikely to be available at the current location.

15. A method of operating a mobile transceiver, the mobile transceiver comprising a processor, and a memory, satellite receiver and cellular transceiver each coupled to the processor, the method comprising:

activating the processor and the satellite receiver from a low power mode in response to an alarm while maintaining the cellular transceiver in a low power mode;

determining, via the satellite receiver, a current location of the mobile transceiver;

calculating, by the processor, a speed of travel using location data obtained from the satellite receiver or an asset tracking log;

identifying, by the processor, one or more waypoints in a travel itinerary at which cellular service is likely to be available at the current location based on a signal strength database by identifying one or more waypoints in the travel itinerary nearest to the current location, identifying a record in the signal strength database for each of the one or more waypoints in the travel itinerary nearest to the current location, each record in the signal strength database including a signal strength indication and a location associated with the signal strength indication;

determining that cellular service is likely to be available at a waypoint in the travel itinerary in response to a determination that the signal strength indication in the identified record is equal to or greater than the signal strength threshold;

determining that cellular service is unlikely to be available at a waypoint in the travel itinerary in response to a determination that the signal strength indication in the identified record is less than the signal strength threshold;

determining one or more estimated time of arrivals (ETAs) at the identified one or more waypoints based on the calculated speed; and setting one or more alarms to be triggered at the one or more ETAs.

* * * * *